(12) United States Patent
Horowitz

(10) Patent No.: US 8,542,104 B2
(45) Date of Patent: Sep. 24, 2013

(54) RFID EDGE SERVER HAVING A PROGRAMMABLE LOGIC CONTROLLER API

(75) Inventor: Marc H. Horowitz, Cambridge, MA (US)

(73) Assignee: Oracle International Corporation, Redwood Shores, CA (US)

(*) Notice: Subject to any disclaimer, the term of this patent is extended or adjusted under 35 U.S.C. 154(b) by 763 days.

(21) Appl. No.: 12/036,898

(22) Filed: Feb. 25, 2008

(65) Prior Publication Data

US 2008/0211632 A1 Sep. 4, 2008

Related U.S. Application Data

(60) Provisional application No. 60/892,491, filed on Mar. 1, 2007.

(51) Int. Cl.
*H04Q 5/22* (2006.01)

(52) U.S. Cl.
USPC ........ 340/10.5; 340/10.1; 340/572.1; 709/220

(58) Field of Classification Search
USPC ............... 707/104.1; 340/10.1, 572.1, 10.5, 340/10.3, 573.1; 700/17; 705/7, 28; 709/220, 709/224
See application file for complete search history.

(56) References Cited

U.S. PATENT DOCUMENTS

| | | | |
|---|---|---|---|
| 7,165,112 B2* | 1/2007 | Battin et al. | 709/230 |
| 7,835,954 B2* | 11/2010 | Banerjee | 705/28 |
| 2005/0092825 A1* | 5/2005 | Cox et al. | 235/375 |
| 2007/0143162 A1* | 6/2007 | Keever et al. | 705/7 |
| 2007/0255820 A1* | 11/2007 | Malik | 709/224 |

* cited by examiner

*Primary Examiner* — Tai T Nguyen
*Assistant Examiner* — Peter Mehravari

(57) ABSTRACT

An RFID edge server is adapted to receive RFID data from RFID readers. The RFID edge server can have a PLC API to allow the RFID edge server to control and receive data from devices.

15 Claims, 9 Drawing Sheets

Ⓐ

```
          <<interface>>
         OPCItemObserver
+ valueChanged(itemName :String, newValue :Object) : void
```

```
            <<interface>>
            OPCStatus
+ getServerState() : OPCServerState
+ getStatusInfo() : String
+ getVendorInfo() : String
+ getProductVersion() : String
```

```
                    HKTransaction
- WAITTIME: int = 10000
- s_log: Logger = Logger.getLogger
- m_pool: ConnectionPool
- m_setup: String
- m_event: String
- m_nextValue: Short
- m_doCancel: boolean
+ HKTransaction(pool :ConnectionPool, setup :String, event :String, value :Short)
+ execute() : boolean
- doTxn(opc :OPC) : boolean
+ cancel() : void
- cancelled() : boolean
```

+m_pool ↓

```
         <<interface>>
         ConnectionPool
+ checkout() : Connection
+ checkin(connection :Connection) : void
+ close() : void
```

RFID EDGE SERVER HAVING A PROGRAMMABLE LOGIC CONTROLLER API

CLAIM OF PRIORITY

This application claims priority to U.S. Provisional Application No. 60/892,491, entitled "RFID Edge Server Having A Programmable Logic Controller API" by Horowitz, filed Mar. 1, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

The present invention relates to Radio Frequency Identification (RFID) technology. Radio Frequency Identification technology is becoming more and more important, especially to manage supply chains.

Radio Frequency Identification technology can allow for the tracking of objects using RFID tags and RFID readers. RFID readers can interrogate the RFID tags using radio waves. The RFID tag typically includes an antenna and a microchip that stores a response code. The majority of RFID tags use a silicon microchip to store a unique serial number, such as an electronic product code (EPC), and usually some additional information. The reader can pass the response code to a computer system to track the objects.

There are two main categories of RFID systems, passive and active systems. Passive RFID tags do not have a transmitter but simply reflect back energy to the reader. Active tags have their own transmitter and power source, such as a battery. Active RFID systems are typically used for tracking large items since the active RFID tags are relatively expensive.

Because passive RFID tags do not use a power source and transmitter, they tend to be cheaper than the active RFID tags. Retailers and manufacturers are adding the passive tags to items in the supply chain. RFID systems can significantly reduce the cost of managing inventory.

Passive RFID tags allow for the possibility of tracking of cartons of materials as they enter and exit entry points of a warehouses and stores. As the passive RFID tags become cheaper, ultimately individual packages can have their own RFID tags and thus the inventory can be tracked very precisely. Additionally, since the RFID technology does not rely on line-of-sight operation, a shopping cart full of goods with RFID tags can be scanned without requiring the goods to be removed from the cart.

RFID tags can be used to implement an electronic product code (EPC). The EPC is a unique number used to identify specific objects in the supply chain. EPC information services (EPCIS) can enable users to exchange EPC related data with trading partners throughout the EPC network.

DETAILED DESCRIPTION

One embodiment of the present invention is an RFID edge server 102 adapted to receive RFID data from RFID readers 104 and 106. The RFID edge server can have a programmable Logic Controller (PLC) Application programming Interface (API) 108 to allow the RFID edge server to control and receive data from devices.

The devices can include electromechanical devices, such as stack lights 110, conveyer 112 and other devices.

The RFID edge server 102 can issue a trigger that can initiate control of a device upon the receipt of RFID data. The RFID edge server 102 can write and read to register in the PLC 116 in order to control the device. The RFID edge server 102 can include a PLC trigger driver that sets events based on input from the PLC.

The PLC 116 can control devices. The RFID edge server can communicate with the PLC 116 using PLC API.

Figure 1A:
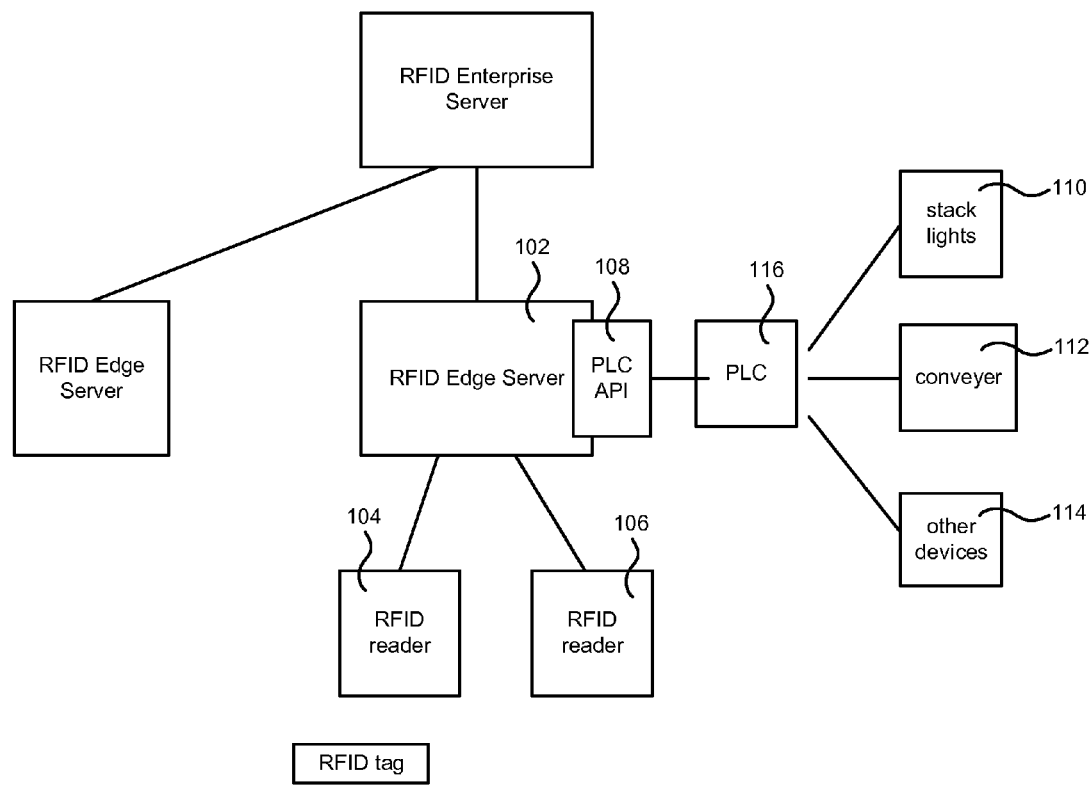
FIG. 1A shows an RFID edge server with a PLC API.
Figure 1B:
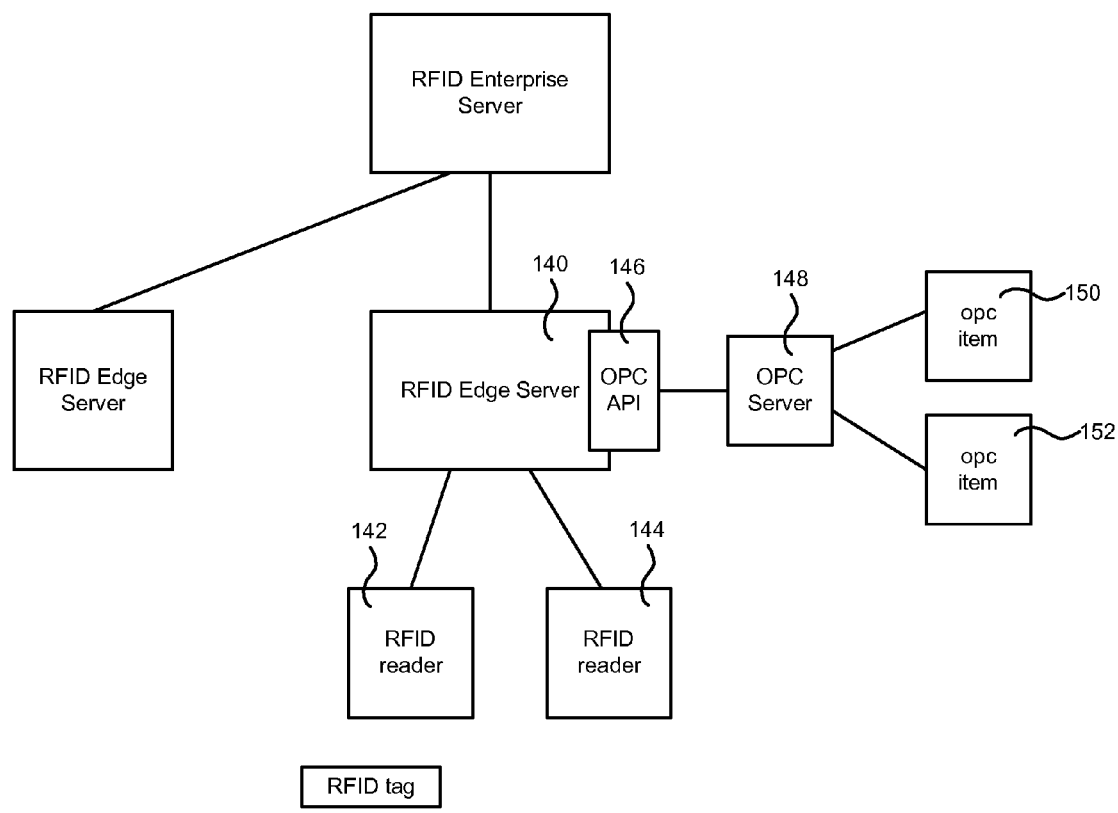
FIG. 1B shows an RFID edge server with an OPC API.
Figure 2A:
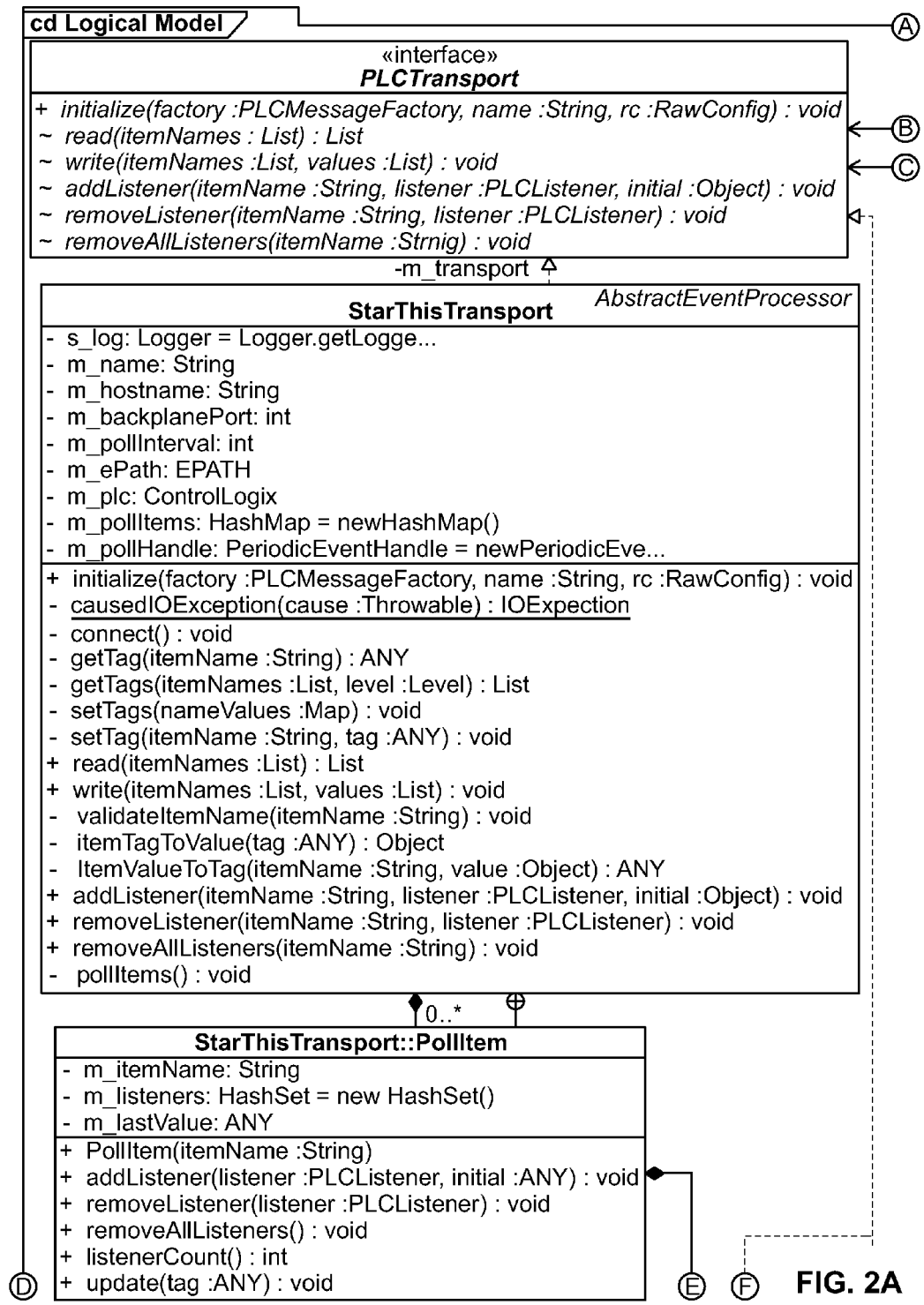
FIGS. 2A-2B shows an exemplary logic model of transport components.
Figure 2B:
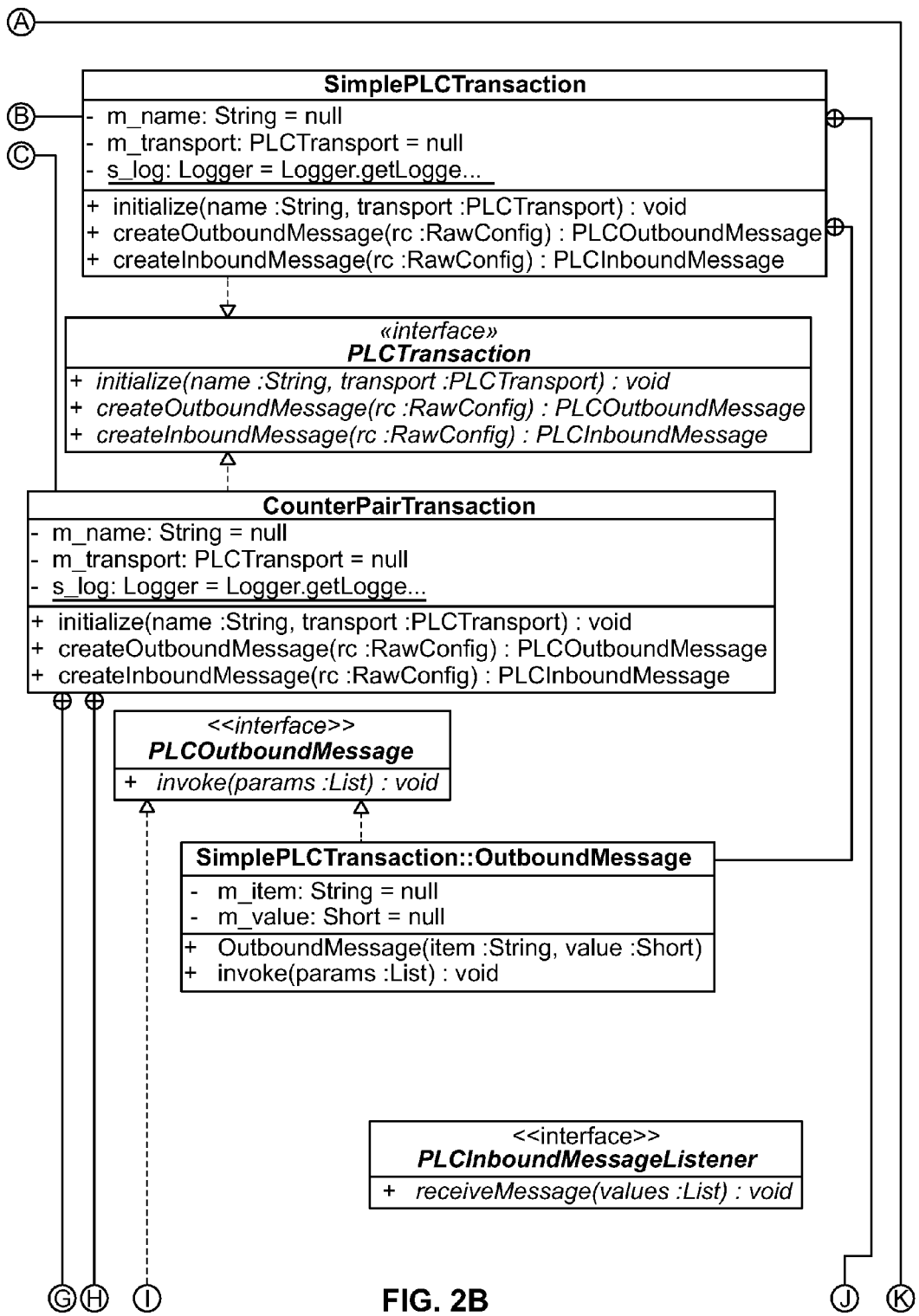
Figure 2C:
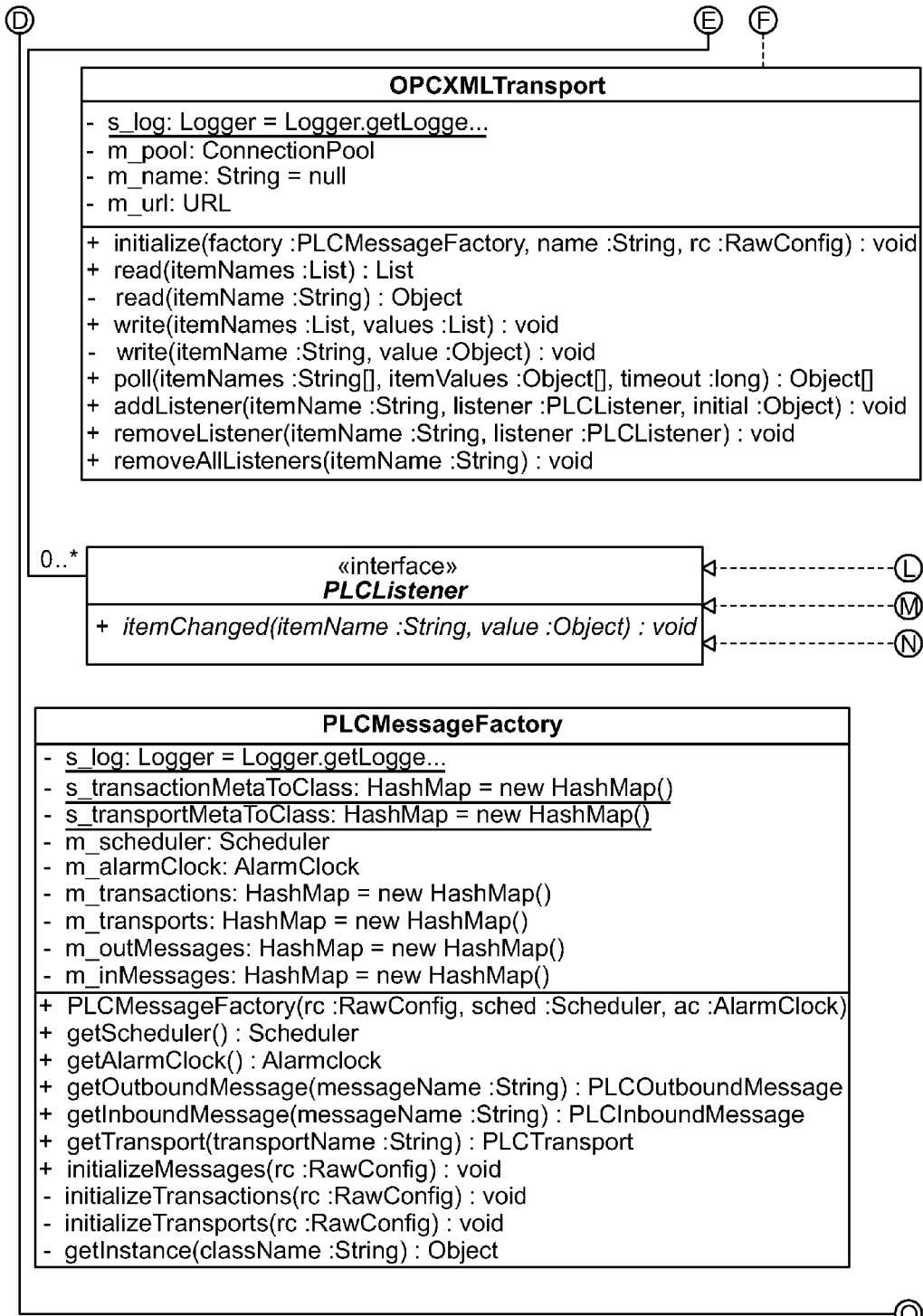
FIGS. 2C-2D shows an exemplary logic model of transaction components.
Figure 2D:
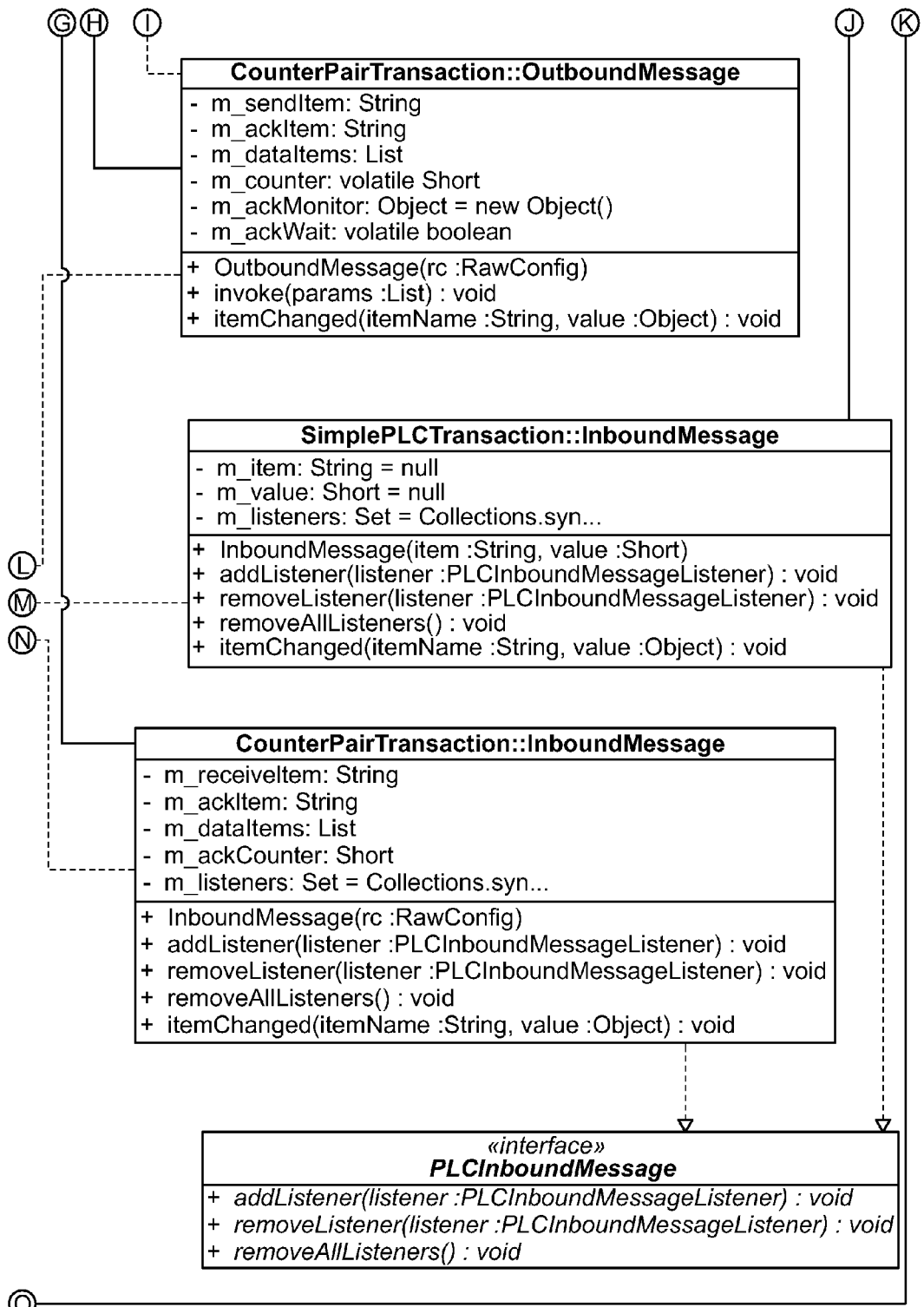

FIG. 1B shows an embodiment wherein an RFID edge server 140 is adapted to receive RFID data from RFID readers 142 and 144. The RFID edge server 140 having a OPC API 146 to allow the RFID edge server 140 to control and receive data from devices to trigger events in RFID edge server 140 based on an OPC item. The trigger can start the collection of data.

OPC is a series of standards specifications that define a standard set of objects, interfaces, and methods for use in process control and manufacturing automation applications to facilitate interoperability. (For more information on OPC, see http://www.opcfoundation.org.)

The OPC API 146 can allow the RFID edge server 140 to interact with OPC server 148 and OPC items 150 and 152.

The following outlines one design for a Programmable Logic Controller (PLC) API for an RFID product. The API can be independent of the software product. It can provide a flexible structure for implementing PLC-related functionality which can then be configured to match the needed devices and hardware for a given application and installation.

Three exemplary cases are:
1. An application needs to send status information to a PLC, such as a case tag verified message.
2. An application needs to be control input from a PLC, such as starting and stopping an event cycle based on motor activity.
3. An RFID edge server uses a PLC as an RFID device for reading and/or printing.

The PLC API can comprise of a set of interfaces, a factory class which uses a ValidatedConfig mechanism to instantiate these classes for the use of PLC-enabled applications, and a set of implementations of the interface which can be easily added to in needed. The API can use dynamic config.

In one embodiment, there can be three layers to the PLC API design. The bottom layer, represented by the PLCTransport interface, can be based on the natural representation of registers on a PLC as "items". The specifics of how items are named and what types are permitted are up to each individual implementation of the PLCTransport interface. An implementation can be used for each supported transport, such as OPC XML DA, Ethernet/IP, Modbus/TCP, etc. If an RFID device provides generally addressable General Purpose Input/Output (GPIO) ports, the driver may also provide a PLCTransport implementation.

The top layer, represented by the PLCInboundMessage and PLCOutboundMessage interfaces, can be based on the natural way in which applications want to interact with PLCs, which is to send and receive messages with some semantic meaning.

To map between these layers, implementations of a PLCTransaction interface can be defined. A PLCTransaction interface can provide methods for creating message objects, using a PLCTransport implementation. The PLCTransaction object can be the application-side implementation of whatever messaging protocol the PLC's embedded logic implements.

com.connecterra.plc.PLCMessageFactory Class can be the factory for the PLC API. It can be initialized with a RawConfig which contains definitions for all the transports, transactions, and messages required by the application. Applications can then use the API calls on the factory class to look up required objects, and call methods on them to interact with the PLC.

The PLCMessageFactory RawConfig instance can be parsed into four concept blocks, named "plcTransport", "plcTransaction", "outboundMessage", and "inboundMessage".

The plcTransport instance can be a required item "provider" which must identify one of the provided PLCTransport implementations. The instance's RawConfig can be passed to the PLCTransport interface's initialize( ) method to set up the transport object.

The plcTransaction instance can have two required items. The first, "transactionMetaName", can identify one of the PLCTransaction implementations. The second, "plcTransport", can be one of the plcTransport names defined elsewhere in the configuration. The instance's RawConfig can be passed to the PLCTransaction interface's initialize( ) method to set up the transaction object.

The inboundMessage and outboundMessage instances can have a required item "plcTransaction" which can be one of the plcTransaction instance names defined elsewhere in the configuration. The instance's RawConfig can be used by the transaction implementation to initialize the message object created.

The com.connecterra.plc.PLCTransport Interface can represent the most basic mechanism for interacting with a PLC. In one embodiment, using this interface, an application can read one or more items, write one or more items, or register a listener to be invoked when an item changes. Because not all functionality is supported by all transports, methods may throw PLCException if the functionality is not implemented.

The API can use Object instances to represent PLC item values, because there are many such types and it easiest to use Java's native types when possible. Implementations of this class can define which types they support, and in order to promote reuse, should use native JAVA types consistent with other implementations whenever possible.

The com.connecterra.plctypes.StarThisTransport Class implementation of PLCTransport can use the StarThis Ethernet/IP library to communicate with PLCs. In one embodiment, it can support the following types:
 java.lang.Boolean: true or false
 java.lang.Short: signed 16-bit integers
 java.lang.Integer: signed 32-bit integers
 java.lang.String: text strings
 java.util.List: arrays of values of any of these types.

In one embodiment, the implementation can use five configuration items:
 licenseDir: the directory in which the StarThis license file is stored
 storageDir: the directory in which the StarThis implementation will store run-time state
 hostname: the hostname or IP address of the PLC
 backplanePort: the backplane port number which holds the PLC controller board
 pollInterval: the number of milliseconds between polls for items being listened to In order to implement the listener mechanism, the class can poll for all listened items every pollInterval milliseconds. When StarThis supports asynchronous receiving of data, this can also be supported with the same API.

The com.connecterra.plctypes.OPCXMLTransport Class implementation of PLCTransport can use the OPC XML DA web service to communicate with PLCs. It supports the following types:
 java.lang.Short: signed 16-bit integers
The implementation can use one configuration item:
 url: the URL of the SOAP endpoint implementing the OPC XML DA web service The com.connecterra.plc.PLCTransaction Interface can represent an application-centric view of interacting with a PLC. Using this interface, an application can send a message consisting of zero or more item values to a PLC, or wait for a message to arrive from the PLC with associated item values. If an implementation does not support sending or receiving of messages, the methods to create those messages may throw PLCException if the functionality is not implemented.

Like the PLCTransport interface, the API can use Object instances to represent PLC item values. Only those types supported by the transaction's underlying transport may be used.

For the com.connecterra.plc.PLCOutboundMessage Interface, a PLCTransaction implementation can return PLCOutboundMessage objects for use by applications. This interface can have a single method, invoke( ), which causes the message to be sent. The method can take a List of parameters which may be used by the transaction's implementation of this interface.

For the com.connecterra.plc.PLCInboundMessage Interface, a PLCTransaction implementation can return PLCInboundMessage objects for use by applications. This interface can have methods to add a listener, remove a listener, and remove all listeners. Listeners can implement PLCInboundMessageListener, which has a single method receiveMessage( ) which is invoked with any associated item values when the message is received.

In the com.connecterra.plctypes.SimplePLCTransaction Class, the SimplePLCTransaction outbound message can write a value into a single item. The message parameters are ignored. The item name and value can be defined by the config items "sendName" and "sendValue", respectively.

The inbound message can wait for a single item to change. When it changes, the new value can be passed as the parameter to all the listeners. Also, an initial value may be provided: if the value when a listener is added differs from this value, or if no initial value is provided, then the listener is invoked immediately with the current value of the item. The item name and initial value are defined by the config items "receiveItem" and "initialValue", respectively.

In the com.connecterra.plctypes.CounterPairTransaction Class, the CounterPairTransaction class can implement a transaction mechanism based on pairs of transaction counters. One counter can be managed by the initiator of a transaction, and the other by the recipient. When an initiator wishes to send a transaction, it can set up parameters in a set of items, then increment the initiator counter. When the recipient detects that the two counters are unequal, it can read the initiator's counter and any parameter items. When it is done processing, it can increment the recipient counter to acknowledge the transaction.

The outbound message is configured with three config items:
sendCounter: the initiator counter
ackCounter: the recipient counter
dataItems: a whitespace-separated list of parameter item names to send when the message is invoked When the invoke method is called, it can be passed a list of values for the dataItems which is equal in length to the number of dataItems. The types can be compatible with what the PLC will expect. The inbound message can be configured with three config items:
receiveCounter: the initiator counter
ackCounter: the recipient counter
dataItems: a whitespace-separated list of parameter item names to send when the message is invoked The implementation can use the transport to listen for changes in the receiveCounter. When it changes to a value different from the ackCounter, the dataItems can be read and the values are passed to the listeners.

This is a sample PropsRawConfig file as used by an exemplary PLCMessageFactory implementation.
[PREFIX].plcTransport.ab1756.provider=StarThis
[PREFIX].plcTransport.ab1756.licenseDir=../../StarThis/dist/licenses
[PREFIX].plcTransport.ab1756.storageDir=/tmp/plc-storage
[PREFIX].plcTransport.ab1756.hostname=ab1756
[PREFIX].plcTransport.ab1756.backplanePort=0
[PREFIX].plcTransport.ab1756.pollInterval=50
[PREFIX].plcTransaction.simple.transactionMetaName=SimpleTransaction
[PREFIX].plcTransaction.simple.plcTransport=ab1756
[PREFIX].outboundMessage.one.plcTransaction=simple
[PREFIX].outboundMessage.one.sendItem=d
[PREFIX].outboundMessage.one.sendValue=1
[PREFIX].outboundMessage.two.plcTransaction=simple
[PREFIX].outboundMessage.two.sendItem=d
[PREFIX].outboundMessage.two.sendValue=2
[PREFIX].inboundMessage.e.plcTransaction=simple
[PREFIX].inboundMessage.e.receiveItem=e
[PREFIX].inboundMessage.e.initialValue=0
[PREFIX].plcTransaction.hk.transactionMetaName=CounterPairTransaction
[PREFIX].plcTransaction.hk.plcTransport=ab1756
[PREFIX].outboundMessage.hkout.plcTransaction=hk
[PREFIX].outboundMessage.hkout.sendCounter=out
[PREFIX].outboundMessage.hkout.ackCounter=outack
[PREFIX].outboundMessage.hkout.dataItems=outval1 outval2 outval3 sgtinAssignment
[PREFIX].outboundMessage.hkout.dataItems=sgtinAssignment
[PREFIX].inboundMessage.hkin.plcTransaction=hk
[PREFIX].inboundMessage.hkin.receiveCounter=in
[PREFIX].inboundMessage.hkin.ackCounter=inack
[PREFIX].inboundMessage.hkin.dataItems=inval1 inval2 inval3 array
[PREFIX].inboundMessage.hkin.dataItems=array
[PREFIX].outboundMessage.intimetest.plcTransaction=hk
[PREFIX].outboundMessage.
intimetest.sendCounter=Program:MainProgram.timetest
[PREFIX].outboundMessage.intimetest.ackCounter=Program:MainProgram.timeteststack The following section outlines a design for the OLE for Process Control (OPC) API that can be used by the compliance engine and Simple Network Management Protocol (SNMP) agent for communicating with a Programmable Logic controller (PLC). OLE stand for Object Linking and Embedding.

The OPC API design can have three related features:
1. A simple JAVA interface for performing basic OPC operations
2. A class which encapsulates HK ladder logic transaction semantics on top of the OPC interface
3. An edge server trigger driver which uses the HK transaction class.

This API can be used to operate material handling equipment, by the SNMP agent to query the PLC for its status, and by the edge server to implement a trigger.

There are several possible implementations of this interface:
1. The OPC XML Data Access (XML-DA) specification defines a SOAP WSDL for communicating with a PLC via a set of XML messages. One implementation of this interface can wrap a SOAP client to provide the OPC functionality.
2. A JAVA/COM bridge mechanism can be used to make calls to a COM OPC server.
3. JNI code can be written to provide direct calls to the OPC COM API.

The OPC and XML-DA interfaces can be very rich. This exemplary design attempts to hide much of this complexity, only providing the basic interfaces needed to implement the use cases. Therefore, in this example only five basic methods are provided. The read method can take an item name, and returns the value currently associated with that item. The write method takes an item name and a value, and writes the value to that item. The poll method takes a read item, and waits for the value to change. The subscribe method can take a read item and an OPCItemObserver which is invoked when the item value changes. Finally, the getStatus method can return status information from the OPC provider.

Object argument and return types. The OPC specification defines about 20 argument and return types, many of which can map cleanly onto native JAVA types.

The example embodiment can use a java.lang.Short, which represents a 16-bit signed integer in OPC. This can be extended when we need to interact with PLC logic which uses other types.

API calls can throw several kinds of exceptions as appropriate. If the underlying implementation is based on a network protocol, then RemoteException can be thrown to indicate a problem with the transport. Otherwise, methods can throw OPCException.

The HKTransaction class can encapsulate a particular style of operation which is based on a set of design rules used by HK when implementing their ladder logic. The constructor can take a ConnectionPool which is used to manage the OPC connections. It can also take a setup item name, an event item name, and a numeric value. When the execute method is called, the following logic can occur:
1. setup is non-null, value is null:
When the transaction begins, the current value of the setup item can be read. This value can be incremented, and written back to the setup item to begin the transaction. When the event item changes to have same value as written to the setup item, the transaction can end. If the transaction is executed again, value is no longer null. Instead, it can have the value most recently written to the setup item.

2. setup is non-null, value is non-null:

When the transaction begins, the specified value is written to the setup item. When the event item changes to have same value as written to the setup item, the transaction ends. If the transaction is executed again, the value is that which was most recently written to the setup item.

3. setup is null, value is null:

When the transaction begins, the current value of the event item is read. When the event item changes to have a different value, the transaction can end.

4. setup is null, value is non-null:

When the transaction begins, no items are read or written. When the event item changes to have the specified value, the transaction ends.

The cancel method can be used to cause the execute method to terminate before the event conditions have been met.

Because OPC instances are single-threaded (except for subscribe) and may be slow, applications may wish to perform multiple OPC operations at once on separate threads. The OPC API implementation can include an implementation of Connection and ConnectionFactory so that the FactoryConnectionPool mechanism can be used to manage multiple connections. Applications which make use of connection pooling can also use of the WorkerQueue mechanism to defer serial work to other threads and provides cancellation semantics.

Figure 3A:
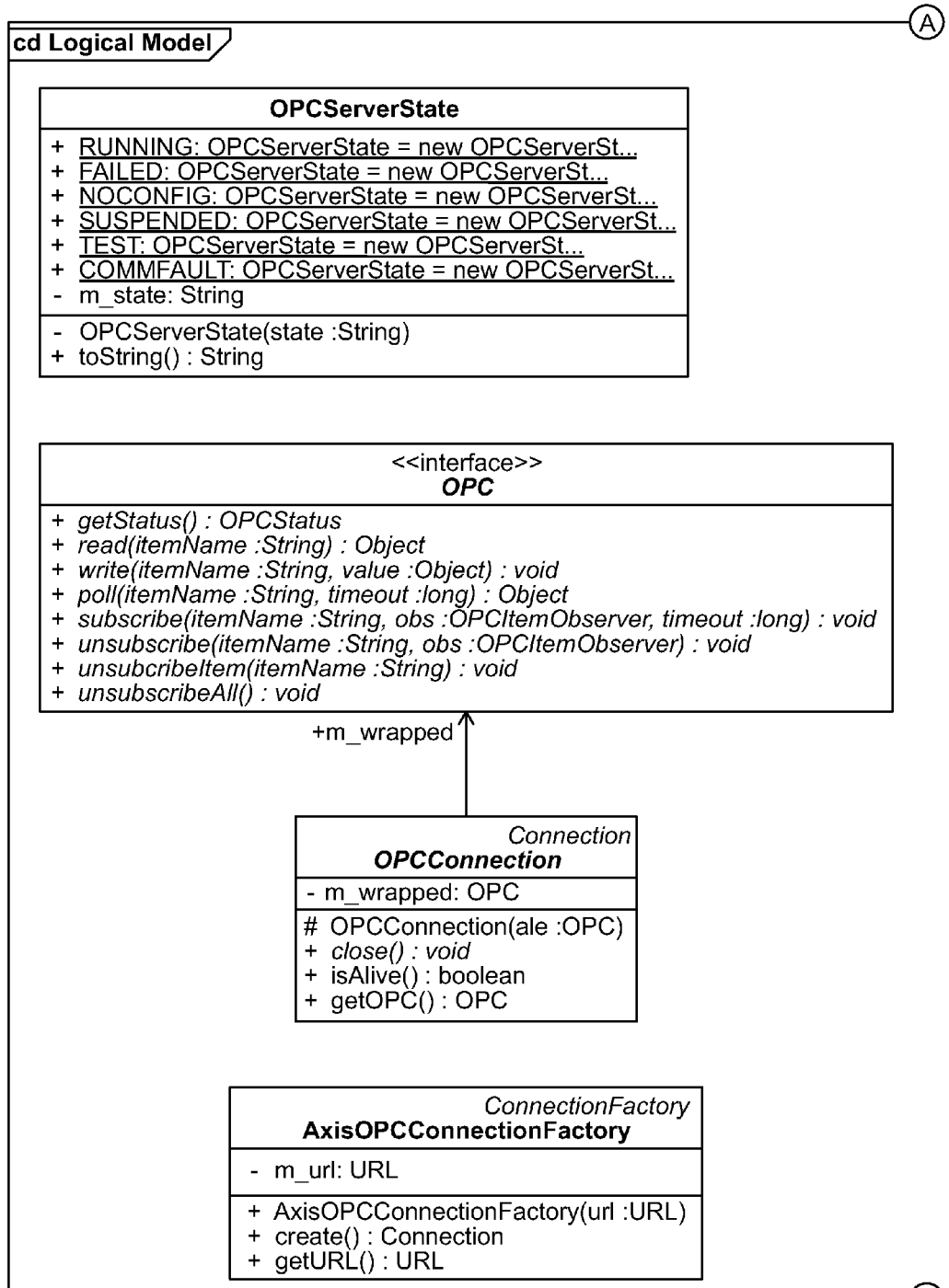
FIG. 3 shows an UML that defines all the classes and method in the OPC API.

FIG. 3 shows an UML that defines the classes and method in the OPC API.

Applications which wish to use PLC events as triggers for event cycles can make use of a new trigger type.

The trigger syntax can be as follows: hktxn: event=<itemE>[;setup=<itemS>][;value=<value>];<endpoint url>

This trigger can be a simple wrapper around the HKTransaction class. The event and setup parameters can be passed as-is to the constructor, and the value parameter is used to create a Short object using that class's constructor. The URL can be used to create the ConnectionPool argument to the constructor. The execute method on the transaction can be invoked in a separate thread when the transaction is first subscribed (additional subscriptions are stored, but don't affect the transaction). When the execute method completes successfully, the observers can be notified. If all subscriptions are removed, the transaction can be cancelled.

The OPCXMLDA component can contain the wsdl file from the OPC Foundation which defines the OPC XML DA interface. The com.connecterra.opc.api package can contain the interfaces which define the OPC API. The com.connecterra.opc.connectionPool package can contain the OPCConnection and AxisOPCConnectionFactory classes. The com.connecterra.opc.hkTransaction package can contain the HKTransaction classes. The com.connecterra.opc.axis.client package can contain the AxisOPCCLinet implementation of the OPC interface. The com.connecterra.ale.triggertypes package can contain the HKTxnTriggerDrive implementation which uses the HKTransaction class.

The following sections describe examples how a RFID Edge Server communicates with and controls RFID devices by interacting with a programmable logic controller (PLC).

RFID Edge Server can allow you to receive information about other devices and control them, by communicating with a programmable logic controller (PLC), which is a specialized industrial computer used for automation of real-world processes. A PLC can have a number of registers, which are used to hold information. Registers are sometimes referred to as items or tags (not to be confused with EPC tags). Applications interacting with the PLC can either:

read the contents of one or more registers (referred to as inbound messages) and take actions based on the values read, or write information to one or more registers to make it available to other applications (referred to as outbound messages).

Configuring the RFID Edge Server to enable PLC communications can include adding the following items to the edge.props file:

One or more transports, which specify the underlying mechanism used to send messages and the location to which messages should be sent. There may be other configuration options specific to the transport chosen. The available implementations can be OPC_XML, StarThis, ModBus and Reader (replaces GPIO, deprecated in this release).

One or more message conventions, which can correspond to the conventions expected by the PLC with which the Edge Server communicates. In one embodiment, the conventions supported are Simple, CounterPair, and Multiple. More than one message can use the same message convention.

One or more messages, which specify the registers on the PLC to read from or write to, and the values to be written. The same message can be sent for multiple events. The messages supported are inboundMessage and outboundMessage. In general, users who want to enable their installation of the RFID Edge Server to control RFID devices using programmable logic controllers will need some custom development effort. The examples provided below illustrate possible configurations after custom development work has been completed.

PLC-Connected Reader and Printer Example. All property names shown in this section can be prefixed with com.connecterra.ale.plc, which is abbreviated [CCAP] in the properties below.

1. Create a backup copy of edge.props and open the original for editing.
2. Define a transport to be used for PLC communications. The supported implementations can be OPC_XML, StarThis, and ModBus.

ModBus configuration
[CCAP].plcTransport.modbus1.metaName=ModBus
[CCAP].plcTransport.modbus1.hostname=ip_address
[CCAP].plcTransport.modbus1.socketTimeout=10000
[CCAP].plcTransport.modbus1.pollInterval=500
OPC_XML configuration
[CCAP].plcTransport.opcABC.metaName=OPC_XML
[CCAP].plcTransport.opcABC.hostname=http://plchost/path
StarThis configuration
[CCAP].plcTransport.ab1756.metaName=StarThis
[CCAP].plcTransport.ab1756.licenseDir=..\licenses
[CCAP].plcTransport.ab1756.storageDir=..\var\plc-storage
[CCAP].plcTransport.ab1756.hostname=ab1756
[CCAP].plcTransport.ab1756.backplanePort=0
[CCAP].plcTransport.ab1756.pollInterval=50

3. Choose a message convention. The types supported are Simple, CounterPair, and Multiple. The notations <var1> and <var2> should be replaced by property names that you choose.

```
# SimpleTransaction configuration
[CCAP].plcMessageConvention.<var1>.metaName=Simple
# The plcTransport name shown below should be a hostname
from step 2.
[CCAP].plcMessageConvention.<var1>.
plcTransport=ab1756
# CounterPairTransaction configuration
[CCAP].plcMessageConvention.
<var2>.metaName=CounterPair
# Define ModBus PLC message convention for writing
[CCAP].plcMessageConvention.
multiple.metaName=Multiple
[CCAP].plcMessageConvention.
multiple.plcTransport=modbus1
# The plcTransport name shown below should be a hostname
from step 2.
[CCAP].plcMessageConvention.
<var2>.plcTransport=ab1756
[CCAP].plcMessageConvention.<var2>.
restart.receiveCounterItem=PLCRestart[2]
[CCAP].plcMessageConvention.<var2>.
restart.ackCounterItem=PLCRestartAck[2]
[CCAP].plcMessageConvention.<var2>.
restart.dataItems=PLCRestart[0]
[CCAP].plcMessageConvention.<var2>.
restart.prefetch=true
# Configure the next two properties on ONE client only
[CCAP].plcMessageConvention.<var2>.
restartAckStatusItem=PLCRestartAck[0]
[CCAP].plcMessageConvention.<var2>.restartDelay=100
```
The array elements shown above and in step 4 refer to PLC registers on the PLCs. Both the register names and element numbers may differ from the sample information shown.

4. Define the inbound and outbound messages for the message convention chosen in the prior step. The notations <var1> and <var2> should be replaced by the property names you chose in step 3.

```
# Simple inboundMessage configuration
[CCAP].inboundMessage.
doorOpen.plcMessageConvention=<var1>
[CCAP].inboundMessage.doorOpen.receiveItem=D2052
[CCAP].inboundMessage.doorOpen.matchValues=true
# CounterPair inboundMessage configuration
[CCAP].inboundMessage.BCRArrival.
plcMessageConvention=<var2>
[CCAP].inboundMessage.BCRArrival.
receiveCounterItem=BCRArrival[19]
[CCAP].inboundMessage.BCRArrival.
ackCounterItem=BCRArrivalAck[0]
[CCAP].inboundMessage.BCRArrival.
dataItems=BCRArrival
# CounterPair outboundMessage configuration
[CCAP].outboundMessage.SgtinAssign.
plcMessageConvention=<var2>
[CCAP].outboundMessage.SgtinAssign.
sendCounterItem=SgtinAssign[59]
[CCAP].outboundMessage.SgtinAssign.
ackCounterItem=SGTINAssignAck[0]
[CCAP].outboundMessage.SgtinAssign.
dataItems=SgtinAssign
```

5. Save the changes to edge.props and restart the Edge Server.

6. Configure your RFID devices to communicate with the PLC by defining devices as shown below using the RFID Devices node in the Administration Console:

Device Type: PLC-Connected Barcode Reader
Logical Reader Name: <a reader name you choose>
Inbound PLC Message Name: <must match the name of the inboundMessage carrying the bar code; for example, BCRArrival in step 4>

Device Type: PLC-Connected Label Print & Apply
Logical Reader Name: <a reader name you choose>
Outbound PLC Message Name: <must match the name of the outboundMessage; for example, SgtinAssign in step 4>

PLC Stack Light Example:

For a PLC stack light, there are two components that you can configure:

PLC stack light device (a PLC stacklight logical reader)
    PLC outbound message definition You can configure the PLC stack light device in the Administration Console or edge.props file. The PLC outbound message can only be defined in edge.props. In order to map which PLC outbound message the PLC stacklight device uses, you can specify the PLC outbound message name, defined in edge.props (in step 3 below, [CCAP].outboundMessage.stacklight.plcMessageConvention=multiple) when you configure the PLC stacklight device (in step 5 below, PLC set stack light message name=stacklight). The PLC outbound message name (for example, stacklight) can be any string you choose, but must be specified in both the PLC stacklight device configuration and PLC outbound message definition.

1. Create a backup copy of edge.props and open the original for editing.

2. Define a PLC stack light device.

```
#Define ModBus PLC stacklight reader. Note that the stack
light reader is
#defined either using the Administration Console or by editing the
#edge.props file. The default behavior
#com.connecterra.ale.dynamicConfig.enabled=true, means
that you configure
#the reader using the Administration Console. If you want to
define and
#configure the reader in the edge.props file, set this property
to false.
com.connecterra.ale.reader.stacklight.class=
com.connecterra.ale.reader-
types.PLCStackLightPhysicalReader
com.connecterra.ale.reader.stacklight.plcMessage=
stacklight
com.connecterra.ale.reader.stacklight.defaultRate=0
com.connecterra.ale.reader.stacklight.
stackLightLogicalReaderName=StackLight
```

3. Choose a message convention and define the outbound messages for the message convention.

```
# Multiple outboundMesssage configuration for stacklight
com.connecterra.ale.plc.outboundMessage.stacklight.
plcMessageConvention=multiple
com.connecterra.ale.
plc.outboundMessage.stacklight.items=c1 c2 c3 c4c5
```

4. Save the changes to edge.props and restart the Edge Server.

5. Configure your RFID devices to communicate with the PLC by defining devices as shown below using the RFID Devices node in the Administration Console:

Note: In one embodiment, if you configured the stack light reader in edge.props, do not perform this configuration step in the Administration Console.

Device Type: PLC Stack Light
PLC Stack Light Logical Reader Name: <a reader name you choose>
PLC set stack light message name: <must match the name of the outboundMessage; for example, stacklight in step 3>
Enable PLC command optimization: false Applications can define event cycle specifications (ECSPec) and programming cycle specification (PCSpec) where the beginning or end of each cycle is triggered by external events. BEA Systems, Inc. provides an extensible mechanism for connecting sources of external events to the ALE engine.

WebLogic RFID Edge Server can include a driver for OPC triggers. An event or programming cycle in the Edge Server can be triggered by polling for a change in an OPC item. The Edge Server can be triggered by polling for a change in an OPC item. The Edge Server can communicate with the OPC service using the OPC XML-DA protocol, which is a SOAP interface to an OPC Data Access provider. The OPC XML-DA implementation can be provided by a third party.

The general form of the trigger URI can be:
opcpoll:itemName=item;http://hostname/location where:
item is the name of the OPC item that the driver polls for changes.
http://hostname/location is the URL that is used to create the connection to the OPC
XML-DA server.

When an event cycle or programming cycle that uses an OPC trigger is first requested (that is, when the event cycle or programming cycle is invoked using the poll or immediate method or subscribed using subscribe), the Edge Server can poll the OPC XML-DA server for the current value of the specified OPC item. Afterwards, each time the value of the OPC item changes, a trigger can be delivered to the event cycle or programming cycle.

The RFID Edge Server can provide a TCP trigger driver that uses simple Telnet input to start or stop ALE event cycles in the Edge Server. To set up TCP triggers, add the tcplisten trigger driver declaration to the edge.props file:
com.connecterra.ale.triggerDriver.tcplisten.class=
com.connecterra.ale.triggertypes.TCPListenTriggerDriver The following example shows how to invoke TCP triggers manually:

1. Open two Telnet sessions, one for the start trigger and one for the stop trigger.

For example,
:prompt> telnet localhost 7070
:prompt> telnet localhost 7071

2. In the Administration Console, edit an ECSpec to set the start and stop trigger URIs, then click
Deploy.
  a. Start Trigger URI:tcplisten:ip_address:7070
  b. Stop Trigger URI:tcplisten:ip_address:7071
If you specify two colons, for example, tcplisten::7070, it uses all IP addresses.

3. Activate the ECSpec by clicking Test or Activate Once.
4. Invoke the start trigger by pressing a carriage return in the Telnet session localhost: 7070.

When the start trigger is fired, the event cycle starts getting tag data. The event cycle stops when either the stop trigger fires or other stop conditions are met.

5. Invoke the stop trigger by pressing a carriage return in the Telnet session localhost: 7071.

The event cycle stops and the ECSpec report is generated.
In production, an application can invoke a TCP trigger by:
1. Opening a socket connection to the TCP port (in the previous example, localhost=7070)
2. Writing a line feed (a character code that advances the screen cursor or printer to the next line, <LF> or 0x0A hex)

The TCP trigger driver can listen for the line feed. When supplied, it can provide the trigger URI to start or stop the event cycle.

Figure 4:
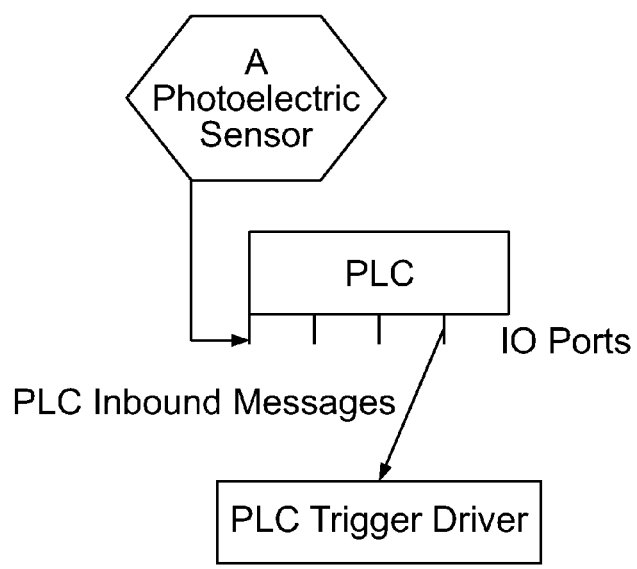
FIG. 4 shows a PLC trigger setup of one embodiment.

The RFID Edge Server can include a PLC trigger driver which converts PLC messages into trigger URIs that you can use to provide the start or stop conditions in event cycle specifications. FIG. 4 illustrates a typical PLC trigger setup.

PLC triggers can be configured in the edge.props file using the following steps: Note: All property names shown in this section should be prefixed with com.connecterra.ale.plc, which is abbreviated [CCAP] in the properties below.

1. Create a backup copy of edge.props and open the original for editing.
2. Define a transport to be used for PLC communications; for example, a Modbus transport
named modbus0.
ModBus transport configuration
[CCAP].plcTransport.modbus0.metaName=ModBus
[CCAP].plcTransport.modbus0.hostname=plcHostName
[CCAP].plcTransport.modbus0.socketTimeout=10000
[CCAP].plcTransport.modbus0.pollInterval=10000
3. Define a message convention; for example, the Simple message convention named simplemodbus0.
[CCAP]
.plcMessageConvention.simplemodbus0.metaName=Simple
[CCAP].plcMessageConvention.simplemodbus0.
plcTransport=modbus0
4. Define the inbound message for the message convention chosen in step 3.
Define inboundMessage 'photoeye1' which is connected to a PLC pin with
address 2052. ('d' is a convention referring to discrete input in the
ModBus protocol).
[CCAP].inboundMessage.photoeye1.
plcMessageConvention=simplemodbus0
[CCAP].inboundMessage.photoeye1.receiveItem=d2052
[CCAP].inboundMessage.photoeye1.matchValues=true
5. Define the PLC trigger.
Define a trigger named 'plcmessage' using the PLCTriggerDriver
com.connecterra.ale.triggerDriver.
plcmessage.class=com.connecterra.ale.tri
ggertypes.PLCTriggerDriver
6. Save the changes to edge.props and restart the Edge Server.
Directional Trigger Driver
Reader Reference SP1 5-5
7. In the Administration Console, edit an ECSpec to set a start or stop condition trigger URI; for example, Start Trigger URI: plcmessage: photoeye1

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A method, comprising:
  receiving, at a radio frequency identification (RFID) edge server, data from one or more RFID readers, wherein the RFID edge server includes a programmable logic controller Application Programming Interface (API) that provides a plurality of functions to the RFID edge server that enable communications between an application deployed on the RFID edge server and one or more devices, wherein the programmable logic controller API includes
    a transport interface that
      uses a set of object instances to represent a plurality of item values for one or more items representing registers at a programmable logic controller (PLC),
      specifies a set of transport implementations, wherein the transport interface is used to transmit a function request to the one or more devices, and wherein each of the transport implementations specifies a name and a location of a particular device within the one or more devices and a transport protocol used to communicate with the particular device, and
      enables the application to read and write to the one or more items or to register one or more listeners to be invoked whenever one of the plurality of item values changes,
    a set of message interfaces that enable communications between the application and the PLC, and are used to communicate with the one or more devices by invoking the plurality of functions provided by the programmable logic controller API, and
    a transaction interface that uses the set of object instances to represent the plurality of item values for the one or more items, and that specifies a set of transaction implementations, wherein each of the transaction implementations provides a mapping between said transport interface and said set of message interfaces that can be used to create a message object that includes the name and the location of the particular device, the transport protocol used to communicate with the particular device, and the function request; and
  invoking, by the application deployed on the RFID edge server, based on the data from the one or more RFID readers, the functions provided by the programmable logic controller API, including
    polling for one or more changes in the plurality of item values,
    passing the polled changes in the plurality of item values to registered listeners, and invoking an event cycle on the RFID edge server,
    using the transport interface, the set of message interfaces, and the transaction interface to create the message object,
    transmitting the message object, from the RFID edge server to the PLC, wherein the message object includes the name and the location of the particular device and the transport protocol used to communicate with the particular device, which are thereafter used by the PLC to communicate the function request transmitted by the transport interface, to the particular device, and
    instructing, by the PLC, the particular device to perform the function request, based on said message object.

2. The method of claim 1, wherein the one or more devices include electromechanical devices.

3. The method of claim 1, wherein the one or more devices include a stacklight.

4. The method claim 1, wherein the one or more devices include a conveyer.

5. The method of claim 1, wherein the RFID edge server issues a trigger that initiates control of one of the one or more devices upon receipt of the data.

6. The method of claim 1, wherein the RFID edge server writes and reads to a register in the PLC in order to control one of the one or more devices.

7. The method of claim 1, wherein the RFID edge server includes a programmable logic controller trigger driver that sets events based on input from the PLC.

8. A system comprising:
  a radio frequency identification (RFID) reader device that reads data from one or more RFID tags;
  an RFID edge server that receives said data from the RFID reader, said RFID edge server wherein the RFID edge server includes a programmable logic controller Application Programming Interface (API) that provides a plurality of functions to the RFID edge server that enable communications between an application deployed on the RFID edge server and one or more devices, wherein the programmable logic controller API includes a transport interface that
uses a set of object instances to represent a plurality of item values for one or more items representing registers at a programmable logic controller (PLC), specifies a set of transport implementations that, wherein the transport interface is used to transmit a function request to the one or more devices, and wherein each of the transport implementations specifies a name and a location of a particular device within the one or more devices and a transport protocol used to communicate with the particular device, and
enables the application to read and write to the one or more items or to register one or more listeners to be invoked whenever one of the plurality of item values changes,
a set of message interfaces that enable communications between the application and the PLC, and are used to communicate with the one or more devices by invoking the plurality of functions provided by the programmable logic controller API, and
a transaction interface that uses the set of object instances to represent the plurality of item values for the one or more items, and that specifies a set of transaction implementations, wherein each of the transaction implementations provides a mapping between said transport interface and said set of message interfaces that can be used to create a message object that includes the name and the location of the particular device, the transport protocol used to communicate with the particular device, and the function request; and
wherein, based on the data from the one or more RFID readers, the RFID edge server receives an invocation of the programmable logic controller API from the application deployed on the RFID edge server, wherein the application provides the invocation using the set of message interfaces of the programmable logic controller API, and wherein the invocation includes
polling for one or more changes in the plurality of item values,
passing the polled changes in the plurality of item values to registered listeners, and invoking an event cycle on the RFID edge server,
creating the message object using the transport interface, the set of message interfaces, and the transaction interface,
transmitting the message object, from the RFID edge server to the PLC, wherein the message object includes the name and the location of the particular device and the transport protocol used to communicate with the particular device, which are thereafter used by the PLC to communicate the function request transmitted by the transport interface, to the particular device, and
instructing, by the PLC, the particular device to perform the function request, based on said message object.

9. The system of claim 8, wherein the one or more devices include electromechanical devices.

10. The system of claim 8, wherein the one or more devices include a stacklight.

11. The system of claim 8, wherein the one or more devices include a conveyer.

12. The system of claim 8, wherein the RFID edge server issues a trigger that initiates control of one of the one or more devices upon receipt of the data.

13. The system of claim 8, wherein the RFID edge server writes and reads to a register in the PLC in order to control one of the one or more devices.

14. The system of claim 8, wherein the RFID edge server includes a programmable logic controller trigger driver that sets events based on input from the PLC.

15. A non-transitory computer readable storage medium storing a set of instructions executable by one or more hardware processors to perform a set of steps comprising:

receiving, at a radio frequency identification (RFID) edge server data from one or more RFID readers, wherein the RFID edge server includes a programmable logic controller Application Programming Interface (API) that provides a plurality of functions to the RFID edge server that enable communications between an application deployed on the RFID edge server and one or more devices, wherein the programmable logic controller API includes
a transport interface that
uses a set of object instances to represent a plurality of item values for one or more items representing registers at a programmable logic controller (PLC),
specifies a set of transport implementations, wherein the transport interface is used to transmit a function request to the one or more devices, and wherein each of the transport implementations specifies a name and a location of a particular device within the one or more devices and a transport protocol used to communicate with the particular device, and
enables the application to read and write to the one or more items or to register one or more listeners to be invoked whenever one of the plurality of item values changes,
a set of message interfaces that enable communications between the application and the PLC, and are used to communicate with the one or more devices by invoking the plurality of functions provided by the programmable logic controller API, and
a transaction interface that uses the set of object instances to represent the plurality of item values for the one or more items, and that specifies a set of transaction implementations, wherein each of the transaction provides a mapping between said transport interface and said set of message interfaces that can be used to create a message object that includes the name and the location of the particular device, the transport protocol used to communicate with the particular device, and the function request; and
invoking by the application deployed on the RFID edge server, based on the data from the one or more RFID readers, the functions provided by the programmable logic controller API, including
polling for one or more changes in the plurality of item values,
passing the polled changes in the plurality of item values to registered listeners, and invoking an event cycle on the RFID edge server,
using the transport interface, the set of message interfaces, and the transaction interface to create the message object, transmitting the message object, from the RFID edge server to the PLC, wherein the message object includes the name and the location of the particular device and the transport protocol used to communicate with the particular device, which are thereafter used by the PLC to communicate the function request transmitted by the transport interface, to the particular device, and instructing, by the PLC, the particular device to perform the function request, based on said message object.

* * * * *

UNITED STATES PATENT AND TRADEMARK OFFICE
CERTIFICATE OF CORRECTION

PATENT NO. : 8,542,104 B2
APPLICATION NO. : 12/036898
DATED : September 24, 2013
INVENTOR(S) : Horowitz It is certified that error appears in the above-identified patent and that said Letters Patent is hereby corrected as shown below:

In the Specifications

In column 4, line 11, delete "listened to" and insert -- listened to. --, therefor.

In column 4, line 20, delete "integers" and insert -- integers. --, therefor.

In column 4, line 23, delete "service" and insert -- service. --, therefor.

In column 5, line 14, delete "invoked" and insert -- invoked. --, therefor.

In column 5, line 23, delete "invoked" and insert -- invoked. --, therefor.

In column 6, line 14, delete "operations" and insert -- operations. --, therefor.

In column 6, line 16, delete "interface" and insert -- interface. --, therefor.

In column 10, line 13, delete "definition" and insert -- definition. --, therefor.

In column 12, line 6, delete "transport" and insert -- transport. --, therefor.

In the Claims

In column 14, line 52, in Claim 4, after "method" insert -- of --.

In column 16, line 50, in Claim 15, after "transaction" insert -- implementations --.

Signed and Sealed this
Twenty-fifth Day of February, 2014

Michelle K. Lee
*Deputy Director of the United States Patent and Trademark Office*